United States Patent Office 3,552,213
Patented Jan. 5, 1971

3,552,213
LIQUID METERING WHEEL
Pierre Auchapt, Bagnols-sur-Ceze, and André Brun, Orsan, France, assignors to Commissariat a l'Energie Atomique, Paris, France
Filed June 3, 1969, Ser. No. 830,052
Claims priority, application France, June 27, 1966, 156,771
Int. Cl. G01n 1/10
U.S. Cl. 73—424                                          5 Claims

ABSTRACT OF THE DISCLOSURE

The metering wheel includes an open vessel with a partition wall which defines on each side two chambers each associated with a constant-level weir, a metering disc carried by a hollow rotary shaft which is rotatably mounted in leak-tight manner within a bearing carried by the partition wall and immersed in one of the chambers. The metering disc is formed by a flat cylinder which comprises on the one hand an internal cavity having a development of 180° within the interior of the disc and a volume which is equal to the flow to be metered per complete revolution of the disc and a connecting duct for providing a radial communication between said cavity and the hollow shaft. The disc comprises on the other hand a portion of reduced thickness over a development of 180° which is complementary to the development of the internal cavity, the reduction in volume of the disc within said portion of reduced thickness being such as to correspond to one-half the volume of said cavity.

---

This invention relates to a metering wheel which makes it possible to take samples of liquids with a wholly constant delivery even in the case of very low values of this latter.

Many practical designs of metering wheels for continuous sampling operations are already known. In one generic type which may be mentioned by way of example, the metering wheel is constructed of a flat cylinder in which is formed a series of cup-shaped cavities uniformly spaced close to the periphery of the wheel, the withdrawal of predetermined successive quantities of liquid being carried out as a result of the rotation of the wheel. However, the disadvantage of metering wheels of this type lies in the fact that the outflow rate is not wholly uniform since it is necessarily interrupted during the time interval which elapses between the end of discharge of any one cup and the commencement of discharge of the following cup.

Another more highly perfected solution consists in constructing the wheel also by means of a flat cylinder but in making provision within this latter for only two cavities, one of which is complementary and immediately follows the other on the periphery of the wheel in order to prevent any discontinuity in the delivery; these cavities are connected to the exterior of the wheel by means of two ducts. While this design accordingly makes it possible to obtain a constant outflow, it does not permit of complete elimination of dead times, in particular when the outflow rate is of a very low order. In fact, by reason of the low rate of flow, the ducts which provide a connection between the cavities and the exterior of the metering wheel cylinder has a very small diameter in which the flow can be disturbed by the phenomenon of capillarity.

The present invention is directed to a metering wheel which circumvents the foregoing disadvantages and makes it possible to obtain a strictly constant delivery in the case of very low values of this delivery. To this end, said metering wheel which comprises an open vessel provided with a partition wall defining on each side two chambers which are associated with a constant-level weir, a metering disc carried by a hollow rotary shaft which is rotatably mounted in leak-tight manner within a bearing carried by the partition wall and immersed in one of said chambers is characterized in that the disc is formed by a flat cylinder comprising on the one hand an internal cavity having a development of 180° within the interior of the disc and a volume which is equal to the flow to be metered per complete revolution of said disc and a connecting duct for providing a radial communication between said cavity and the hollow shaft, and further comprising a portion of reduced thickness over a development of 180° which is complementary to the development of the internal cavity, the reduction in volume of the disc within said portion of reduced thickness being such as to correspond to one-half the volume of said cavity.

Apart from this main arrangement, a metering wheel as constructed in accordance with the invention has a number of related properties which are to be considered preferably in combination with the foregoing but which could be considered separately if necessary, these additional arrangements being especially concerned with the following points:

The weirs which are associated with the two chambers are arranged at the same level within the vessel, The common level of the weirs is located in the axis of the hollow shaft which carries the disc, The chamber which does not contain the disc is supplied by means of a duct which has its outlet at the lower portion of said chamber, The hollow shaft comprises a toothed annulus which is driven in rotation by means of a reduction-gear motor and speed-changing mechanism.

Further secondary features will become apparent from the following description of one form of construction which is given by way of indication but not in any limiting sense, reference being had to the accompanying drawings, in which.

Figure 1:
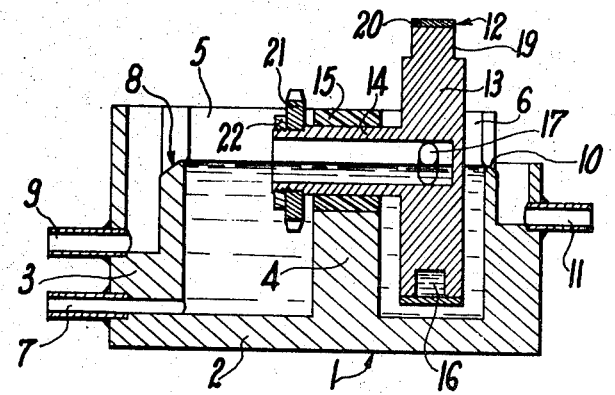
FIG. 1 is a diagrammatic sectional view of a metering wheel as constructed in accordance with the invention.

From FIG. 1, it is apparent that the metering wheel under consideration comprises essentially an open reservoir 1 with a base 2 and with a side wall 3. Said base 2 has a partition wall 4 which is disposed substantially at the center of the reservoir and delimits within this latter and with the side wall 3 two separate chambers 5 and 6. The chamber 5 is fed with liquid to be metered via an admission pipe 7 which has its opening at the bottom of said chamber whilst the level in this latter is maintained at a constant value by means of a weir 8. The overflow of liquid into the chamber 5 thus passes over the weir and is discharged through an outlet pipe 9. Similarly, provision is made within the chamber 6 for a weir 10 which is preferably designed so that the level which it determines constantly within said chamber is the same as the level defined within the chamber 5 by the weir 8. The liquid which flows over the weir 10 is discharged through an outlet pipe 11, the quantity of liquid which flows through said pipe being precisely the quantity which is measured by the device according to the invention.

In order to measure the desired dose, the reservoir 1 is associated with a metering disc 12 designed in the form of a flat cylinder 13 which dips into the chamber 6 and has an axial extension in the form of a hollow shaft 14 which is open at the end remote from the cylinder. Said shaft 14 passes at right angles through the partition wall 4 of the reservoir and is rotatably mounted in a sealed bearing 15 which is provided in said partition wall. Preferably, the different components referred-to above are so arranged that the liquid which is contained in the chamber 5 and penetrates into the hollow shaft 14 is located at the level of the axis of rotation of said shaft.

Figure 2:
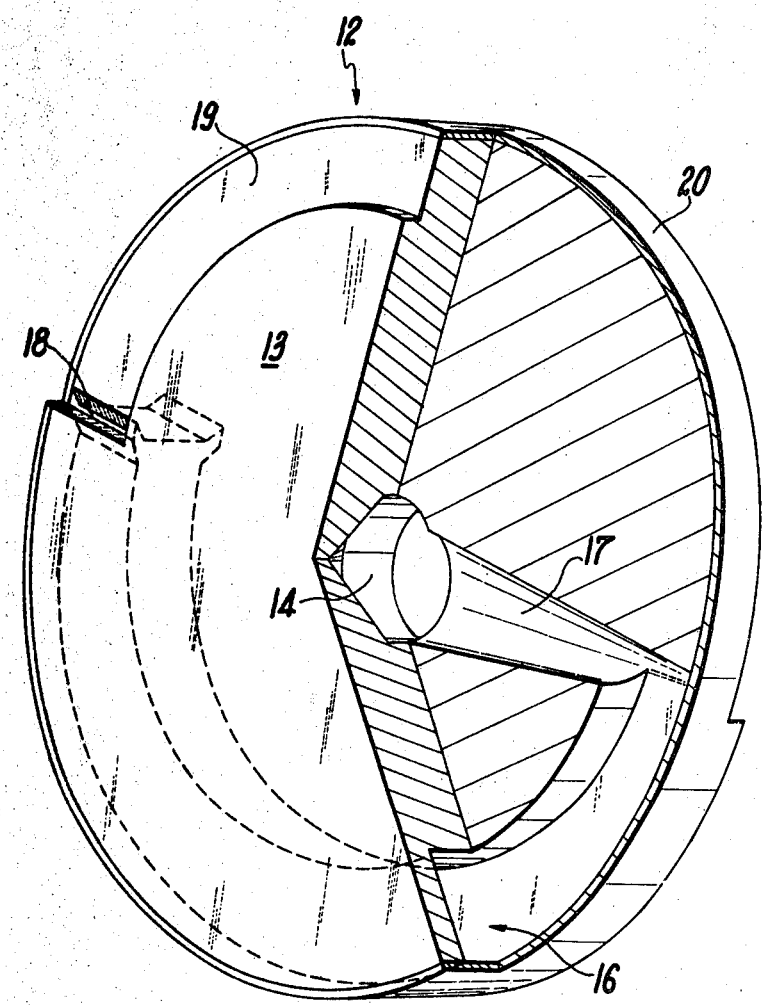
FIG. 2 is an enlarged view in perspective of the metering disc which is employed in the construction of said wheel.

In accordance with the invention, the metering disc 12 as shown in constructional detail on a larger scale in FIG. 2 comprises an internal cavity 16 which is machined in the disc in the vicinity of the periphery thereof and extends through an angle of 180°. The cavity 16 communicates with the interior of the hollow shaft 14 by way of a connecting duct 17 which is formed radially in the flat disc 13 and is provided with a discharge opening 18 formed in the cavity 16 at the end remote from the duct 17. On the side opposite to the cavity 16, the disc 13 is additionally provided with a thinned portion 19 which is formed on said disc, which also extends through an angle of 180° and is consequently complementary to the portion which corresponds to the cavity. This thinned portion 19 corresponds to a reduction in volume of the disc which is so determined as to be strictly equal to one-half the volume of the cavity 16, the volume of this latter being in turn chosen so as to be equal to the volume of liquid to be measured which it is desired to obtain at the outlet of the apparatus in respect of each full revolution of the disc 12. Leak-tightness of the cavity 16 is achieved externally of the disc by means of a ring 20 of suitable material which is fixed preferably by shrinking onto the cylinder 13.

Finally, the device is completed by means of a toothed annulus 21 which is keyed by means of a collar 22 on the end of the hollow shaft 14. Said toothed annulus is adapted to cooperate with a reduction-gear motor unit with speed-changing mechanism (not shown) which serves to control the rotation of the hollow shaft and consequently of the metering wheel 12 which is coupled thereto.

The operation of the metering wheel as thus constructed can readily be explained by reference to the diagrammatic FIGS. 3 to 8 which represent the metering disc in different successive positions corresponding to one full revolution performed by said disc about its own axis in the direction of the arrow 23.

Figure 3:
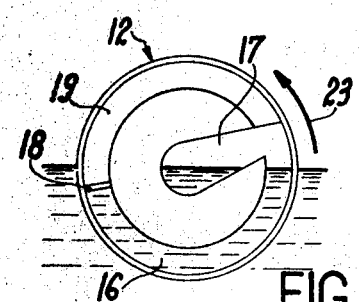
FIGS. 3 to 8 are very diagrammatic views of the disc of FIG. 2 which serve to explain the different stages of operation of the metering wheel.
Figure 4:
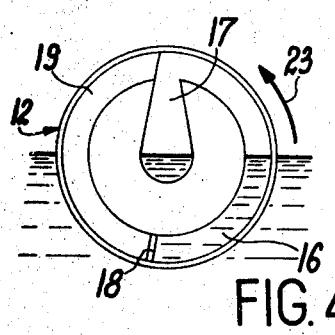
Figure 5:
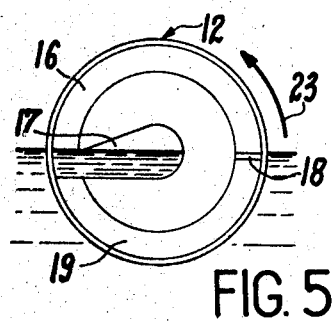

FIGS. 3, 4 and 5 thus illustrate the stage of discharge of the liquid contained in the cavity 16 of the disc 12. The level of said liquid is initially adjusted within the chamber 5 by means of the weir 8. At the outset, the liquid penetrates into the hollow shaft 14 along the axis thereof, then passes through the connecting duct 17 and completely fills the cavity 16. When the disc 12 is set in rotation at a predetermined speed by means of the toothed annulus 21, the portion 19 of the cylinder 13 penetrates progressively into the liquid which is contained in the chamber 6 and the level of which is maintained at a constant value by means of the weir 10. Since the difference in the immersed volumes of the two halves of the disc 12 which correspond respectively to the cavity 16 on the one hand and to the thinned portion 19 on the other hand is established by design in a ratio of two to one, respectively, it is readily apparent that the rotation of the disc through an angle of 180° in the direction of the arrow 23 causes a volume of liquid corresponding to one-half the volume of the cavity to be discharged from the chamber 6. In fact, the rotation of the disc has the effect of draining-off the cavity 16 through the outlet 18 of this latter. This volume is immediately divided into two parts: the first part compensates for the free volume afforded by the thinned portion 19 of the disc which penetrates into the chamber; the second part is progressively discharged over the weir 10 towards the outlet pipe 11.

Figure 6:
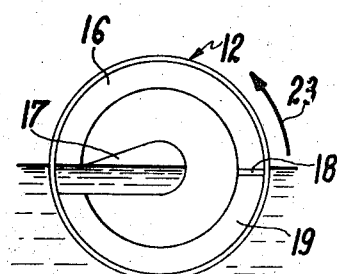
Figure 7:
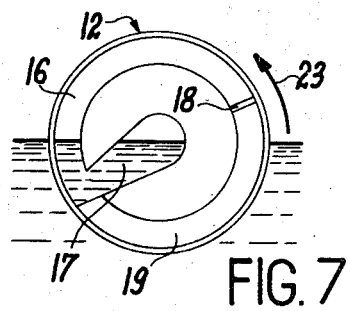
Figure 8:
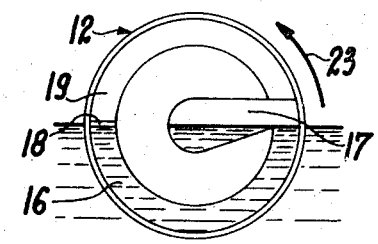

In the following stage which corresponds to the stage of complementary rotation through 180° as illustrated in FIGS. 6 to 8, the cavity 16 is progressively filled with liquid admitted through the connecting duct 17 as the thinned portion 19 emerges by degrees from the chamber 6. During this stage, the volume immersed in the liquid which corresponds to the progressive admission into the chamber of that portion of the disc which contains the cavity is instantaneously compensated to the extent of one-half by the thinned portion 19 which emerges at the same time. As a result, only one-half of said volume is again discharged over the weir 10 towards the outlet pipe 11. By reason of the design data hereinabove defined, said volume is identical with that which is supplied during the first stage.

There is thus provided a metering wheel which makes it possible to obtain a strictly constant delivery of liquid at the outlet irrespective of the value of said delivery which may in fact be very small since it is solely dependent on the one hand on the value of the volume given to the cavity of the metering disc and on the other hand on the speed of rotation of this latter. By way of indication, in the case of a metering disc having a cavity of 30 cc. which is driven in rotation at a speed which can vary between 0.05 and 5 r.p.m., deliveries between 80 cc./hr. and 8.9 l./hr. are obtained with a precision of 0.3% and a wholly uniform flow.

It is clearly to be understood that the invention is not limited in any sense to the embodiment which has been described with reference to the drawings solely by way of example and that all alternative forms are included within its scope.

What we claim is:

1. A metering device comprising an open vessel, a partition wall in said vessel defining two chambers one on each side of partition, a constant-level weir for each of said chambers, a metering disc, a hollow rotary shaft for said disc rotatably mounted in leak-tight manner within a bearing carried by said partition wall, said disc being immersed in one of said chambers, fluid to be metered flowing from the other of said chambers into said shaft, said disc being a flat cylinder, an internal cavity in said cylinder extending through 180° of the circumference thereof and having a volume equal to the flow to be metered per complete revolution thereof, a connecting duct providing radial communication between said cavity and said hollow shaft, said cylinder having a portion of reduced thickness extending for the other 180° of the circumference of said cylinder, the reduction in volume of said cylinder caused by said portion of reduced thickness being one-half the volume of said cavity.

2. A metering device in accordance with claim 1, said weirs being at the same level within said vessel.

3. A metering device in accordance with claim 2, the level of said weirs being along the axis of said hollow shaft.

4. A metering device in accordance with claim 1, the other of said chambers being supplied by a duct opening in the lower portion of said other chamber.

5. A metering device in accordance with claim 1, including a toothed annulus on said shaft driven in rotation for rotating said disc.

References Cited

UNITED STATES PATENTS

| | | | |
|---|---|---|---|
| 1,372,768 | 3/1921 | Mott | 222—56 |
| 2,476,163 | 7/1949 | Trebler | 73—424 |

FOREIGN PATENTS

| | | | |
|---|---|---|---|
| 454,403 | 2/1913 | France | 73—424X |
| 34,588 | 9/1885 | Germany | 73—424 |

LOUIS R. PRINCE, Primary Examiner

D. M. YASICH, Assistant Examiner